(No Model.)
C. D. WRIGHT & C. A. FISHER.
AUTOMATIC SHUNT FOR TELEPHONE LINES.
No. 313,640. Patented Mar. 10, 1885.
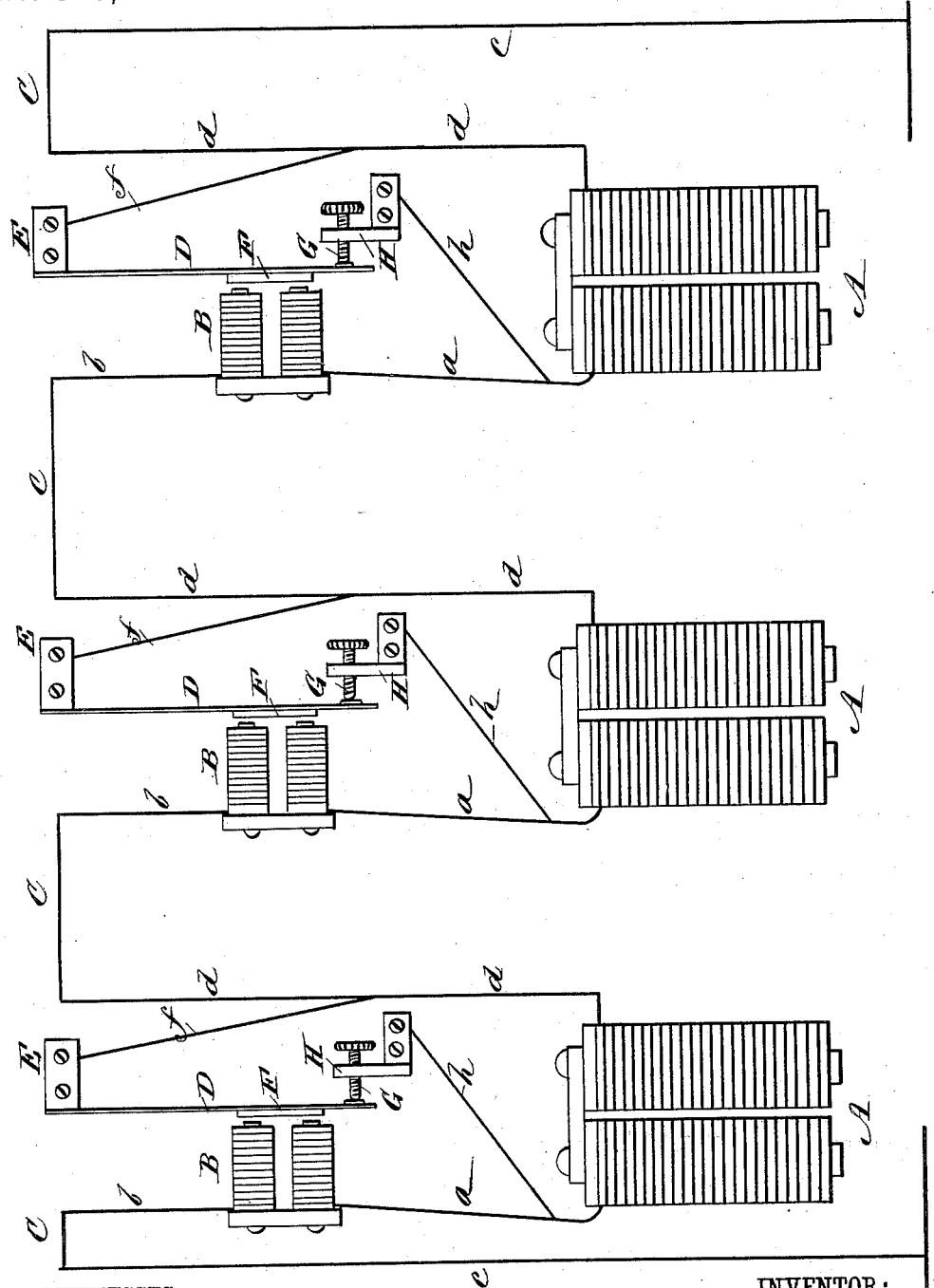
WITNESSES:
C. Neveux
C. Sedgwick
INVENTOR:
C. D. Wright
C. A. Fisher
BY Munn & Co
ATTORNEYS.

UNITED STATES PATENT OFFICE.

CHARLES D. WRIGHT AND CHARLES A. FISHER, OF PETERSBURG, ILLINOIS; SAID FISHER ASSIGNOR OF PART OF HIS RIGHT TO SAID WRIGHT.

AUTOMATIC SHUNT FOR TELEPHONE-LINES.

SPECIFICATION forming part of Letters Patent No. 313,640, dated March 10, 1885.

Application filed June 21, 1884. (No model.)

*To all whom it may concern:*

Be it known that we, CHARLES D. WRIGHT and CHARLES A. FISHER, of Petersburg, in the county of Menard and State of Illinois, have invented a new and Improved Automatic Shunt for Telephone-Lines, of which the following is a full, clear, and exact description.

The object of this invention is to reduce the resistance when there are many magnets on the same circuit, which reducing, however, does not interfere with the signaling device.

The invention consists in the combination, with a telephone-line, of a series of signaling-magnets, and of an electro-magnet and spring for each signaling-magnet, which electro-magnets automatically cut out the signaling-magnets when the reverse current does not pass through the said electro-magnets, and automatically bring the several signaling-magnets in circuit when the signaling-current passes through the electric magnets.

Reference is to be had to the accompanying drawing, forming a part of this specification, in which a diagram of a telephone-line provided with our automatic resistance-reducer is shown.

The line shown has three stations, in each of which stations is a polarized signaling-magnet, A, one end of which is connected by a wire, *a*, to an electro-magnet, B, from the opposite end of which a wire, *b*, leads to the line-wires C, which line-wires at the end of the circuit or line are connected by wires *c* with the ground. That end of each magnet A opposite the one connected by the wire *a* with the magnet B is connected by a wire, *d*, with the line-wires C. At the free end of the electro-magnet B that is opposite the ends of the cores a weak spring, D, is arranged, which has one end secured on a block, E. On the spring D an armature-plate, F, is secured, which is opposite the free ends of the magnet-cores. At the free end of each spring D a screw, G, is arranged in a standard, H, which standard H is connected by a wire, *h*, with the corresponding wire, *a*. The spring D is electrically connected by a wire, *f*, with the corresponding wire, *d*. The magnets A B, the spring D, the armature F, and the screw G are arranged in all three stations.

The operation is as follows: When the magnets B are not excited, they do not attract the armature F, and the spring-tension in the springs D throws the said springs against the ends of the screws G. The circuit will then be as follows: Beginning at the left, through the wire *c*, the wire C, the wire *b*, the magnet B, the wire *a*, the wire *h*, the standard H, the screw G, the spring D, the wire *f*, the wire *d* to the line-wire C, and so on through all the instruments. The above-described circuit is the conversation-circuit. By thus arranging the parts the heavy resistance of the large magnets A A A is avoided, and the only resistance encountered is that of the small magnets B B B, which resistance is about one-tenth, or less, of that of the magnets A. In signaling, when the heavy reverse currents are passed through the small electro-magnets B, they become excited and attract the armature-plates F, whereby the circuit will be from the wires *b* through the magnets B, the wires *a*, the magnets A, and the wires *d* to the line-wires C, and so through the instrument, as by the attraction of the armatures F by the magnets B the contact between the springs D and the screws G is broken. As soon as the heavy reverse current ceases the magnets B are no longer excited, the springs D tear off the armatures F, and the end of each spring D comes in contact with its corresponding screw, G, whereby the short circuit or non-resistance circuit is established.

Having thus described our invention, we claim as new and desire to secure by Letters Patent—

1. In a telephone-line, an automatic resistance and retardation reducer consisting of an electro-magnet placed in the line and connected with the large signaling-magnet, of a spring placed opposite the ends of the cores of the electro-magnet, and carrying the armature of said magnet, and of a binding-screw against which the end of the spring rests, the binding-screw and the spring being connected with the line-wires, or wires leading to the line-wires, at opposite sides of the signaling-magnets, substantially as herein shown and described.

2. The combination, with a telephone-line, of the signaling-magnet A, the electro-magnet B, connected with the signaling-magnet, the spring D, and armature attached thereto, connected by a wire with the line leading from the corresponding magnet, A, to the next magnet, B, and of the screw G, against which the end of the spring D rests, which screw is connected with the wire $a$, connecting the corresponding magnet, B, with the corresponding magnet, A, substantially as herein shown and described.

3. The combination, with the signaling-magnet A, of the magnet B, the spring D, the armature F on the same, the blocks H, the screw G, held in the same, the wire $h$, connecting the block H with a wire leading to one end of the magnet A, and the wire $f$, connecting the spring D with the wire leading to the other end of the magnet A, substantially as herein shown and described.

4. The combination, with a telephone-line, of a signaling-magnet for each station, and an electro-magnet and a spring for each signaling-magnet, which magnet and spring automatically cut out the signaling-magnet when the reverse current does not pass through the said electro-magnet, by reason of the retraction of its armature against a back stop to close a short circuit around the signaling-magnet, and automatically bring the said signaling-magnet in circuit when the reverse current of unusual length passes through the electro-magnet, substantially as herein shown and described.

CHARLES D. WRIGHT.
CHARLES A. FISHER.

Witnesses:
W. L. ROBERTSON,
O. B. CARTER.